United States Patent [19]

Mlynek

[11] Patent Number: 4,683,548
[45] Date of Patent: Jul. 28, 1987

[54] BINARY MOS RIPPLE-CARRY PARALLEL ADDER/SUBTRACTER AND ADDER/SUBTRACTER STAGE SUITABLE THEREFOR

[75] Inventor: Daniel Mlynek, Wolfgantzen, France
[73] Assignee: ITT Industries, Inc., New York, N.Y.
[21] Appl. No.: 780,226
[22] Filed: Sep. 24, 1985

Related U.S. Application Data

[63] Continuation of Ser. No. 311,377, Oct. 14, 1981, abandoned.

[30] Foreign Application Priority Data

Nov. 3, 1980 [EP] European Pat. Off. ......... 80106726.5

[51] Int. Cl.⁴ .............................................. G06F 7/50
[52] U.S. Cl. .................................................... 364/786
[58] Field of Search ......................... 364/786, 783, 780

[56] References Cited

U.S. PATENT DOCUMENTS

| | | | |
|---|---|---|---|
| 3,496,345 | 2/1970 | Mitchell | 364/782 |
| 3,535,502 | 10/1970 | Clapper | 364/786 X |
| 3,602,705 | 8/1971 | Cricchi | 364/786 |
| 3,603,776 | 9/1971 | Weinberger | 364/786 |
| 3,636,334 | 1/1972 | Svoboda | 364/786 |
| 4,229,802 | 10/1980 | Eggermont | 364/786 |
| 4,336,600 | 6/1982 | Houdard et al. | 364/786 X |
| 4,369,500 | 1/1983 | Fette | 364/786 X |

OTHER PUBLICATIONS

Beraud et al, "High-Speed Accumulator" *IBM Tech. Disclosure Bulletin,* vol. 17, No. 1, Jun. 1974, pp. 118–119.

*Primary Examiner*—David H. Malzahn
*Attorney, Agent, or Firm*—T. L. Peterson

[57] ABSTRACT

The adder/subtracter disclosed sums a plurality of n-digit binary-coded numbers (A, B, C . . . Z) successively by forming corresponding partial sums (Sb, Sc . . . Sz) according to the following recursive formula:

$$A+B+C \ldots +Z=((A+B)+C) \ldots +Z=(Sb+C) \ldots +Z=Sc \ldots +Z=Sz.$$

The partial sums are formed by means of parallel adders/subtracters which, in turn, include adder/subtracter stages. Each of the stages is formed by a full adder and a switching section which forms the ones complement of the subtrahend in case of subtraction. The inputs of the parallel adder/subtracter for the first partial sum are preceded by series-connected like delay elements beginning with the second lowest weight and increasing by one from weight to weight, the delay provided by the delay elements being equal to the time required to generate the carry of the full adder. Beginning with the next to the last stage of the parallel adder/subtracter, additional like delay elements are connected in series between the output of the stages and the sum output terminal, which also increase by one from stage to stage.

Additional delay elements and transfer stages may be placed between the switching section and the full adder, so that it is possible to multiply one of the addends by a power of two and then to form the sum. A circuit for the switching section is provided which is considerably simpler than the EXCLUSIVE-OR gate commonly used there.

19 Claims, 3 Drawing Figures

$S_1 = \pm S_k \cdot 2^q + L$ $q = \{-r, -r+1, \ldots 0, \ldots r-1, r\}$

BINARY MOS RIPPLE-CARRY PARALLEL ADDER/SUBTRACTER AND ADDER/SUBTRACTER STAGE SUITABLE THEREFOR

This application is a continuation of application Ser. No. 311,377, filed Oct. 14, 1981, now abandoned.

BACKGROUND OF THE INVENTION

The present invention relates to binary MOS ripple-carry parallel adders/subtracters which are integrated using enhancement-mode insulated-gate field-effect transistors and with which a plurality of numbers each represented in an n-digit binary code can be added or subtracted from each other by successive summation forming partial sums. The formation of partial sums of the numbers A, B, C . . . Z takes place according to the following recursive formula:

$$A+B+C+ \ldots Z=((A+B)+C) \ldots +Z=(Sb+C) . \ldots +Z=Sc \ldots +Z=Sz.$$

Each partial sum is formed in a parallel adder/subtracter comprising an adder/subtracter stage per digit of each partial sum. The adder/subtracter stage, in turn, includes a switching element taking into account the sign of the number, i.e., of a switching element for switching from addition to subtraction which has a first input for a switching signal and a second input for that one of two digit signals of the number which serves as the subtrahend in case of subtraction. Furthermore, the adder/subtracter stage includes a full adder having a first input receiving directly the digit signal serving as the minuend in case of subtraction, and a second input connected to the output of the switching element.

Parallel adders/subtracters with adder/subtracter stages of this kind are described in a book by A. Shah, et al, "Integrierte Schaltungen in Digitalen Systemen", Vol. 2, Basel, 1977, pages 124 to 129, particularly FIG. IX.28 on page 125. On pages 107 to 109 of that book, so-called parallel counters for adding a plurality of numbers are explained in a general form. The parallel counter shown there in FIG. IX.18, which is referred to as a "(5,3) parallel counter" and is capable of summing five single-digit numbers, includes three sets of series-connected logic gates of different kind. On pages 87 to 103, the book gives information on commercially available bipolar integrated circuits for adders.

Direct application of the fundamental principles of conventional ripple-carry parallel adders/subtracters, explained with reference to bipolar integrated circuits, to integrated circuits using insulated-gate field-effect transistors, i.e., to so-called MOS circuits, is not readily possible because MOS technology differs widely from bipolar technology in some respects.

SUMMARY OF THE INVENTION

An object of the present invention is to provide a ripple-carry parallel adder/subtracter which can be realized using MOS technology, and in which carry save, see for instances pages 106 and 129 of the above reference, is implemented in a particularly simple manner.

Another object of the present invention is to provide an adder/subtracter stage which is considerably simpler than the prior art adder/subtracter stages.

FIG. IX.28 on page 125 of the above reference shows that such a stage includes a conventional full adder preceded by an EXCLUSIVE-OR gate one input of which is fed with the switching signal determining the sign of the arithmetic operation, and the other input of which is presented with the signal serving as the subtrahend in case of subtraction. However, EXCLUSIVE-OR gates commonly include at least two stages of series-connected basic gates, such as NAND gates, see for instance, FIG. 9.4 on page 89 of the above reference. Since each stage of logic gates causes a given signal delay, the delay produced by the preceding EXCLUSIVE-OR gate must be added to the full-adder delay in the prior art adder/subtracter stage of FIG. IX.28.

Thus, a further object of the present invention is to provide a considerably simpler MOS circuit for the above-mentioned EXCLUSIVE-OR gate which makes it possible to switch from addition to subtraction.

Still a further object of the present invention is to provide transfer elements which enable performing in an advantageous manner an arithmetic operation which occurs in digital filters, for example, and in which one of the signals to be summed, i.e., one of the numbers or one of the calculated partial sums, for example, must then be multiplied by a power of two.

A parallel adder/subtracter for combining a plurality of numbers each represented by a plurality of parallel bits includes an input delay arrangement and an output delay arrangement.

The input delay arrangement couples two of the numbers to a first adder/subtracter comprising a plurality of full adder stages, such that each bit of the first number and each bit of the second number is delayed by one predetermined time period more than the preceding lower order bit of the first and second number respectively.

The output delay arrangement delays each bit of the sum output by one predetermined time period greater than the suceeding higher order output bit.

The predetermined time period for both the input and output delay arrangement is the time required to generate a carry signal in one of the full adders.

The essential advantages of the present invention are that even large integrated parallel adders/subtracters of highly regular circuit construction can be provided which, particularly if realized as two-phase clocked circuits, become particularly simple as far as the realization of the delay elements is concerned. The delay elements are inverters which are clocked with respect to the signal transfer, so that the delay is given by half the period of the two clock signals.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
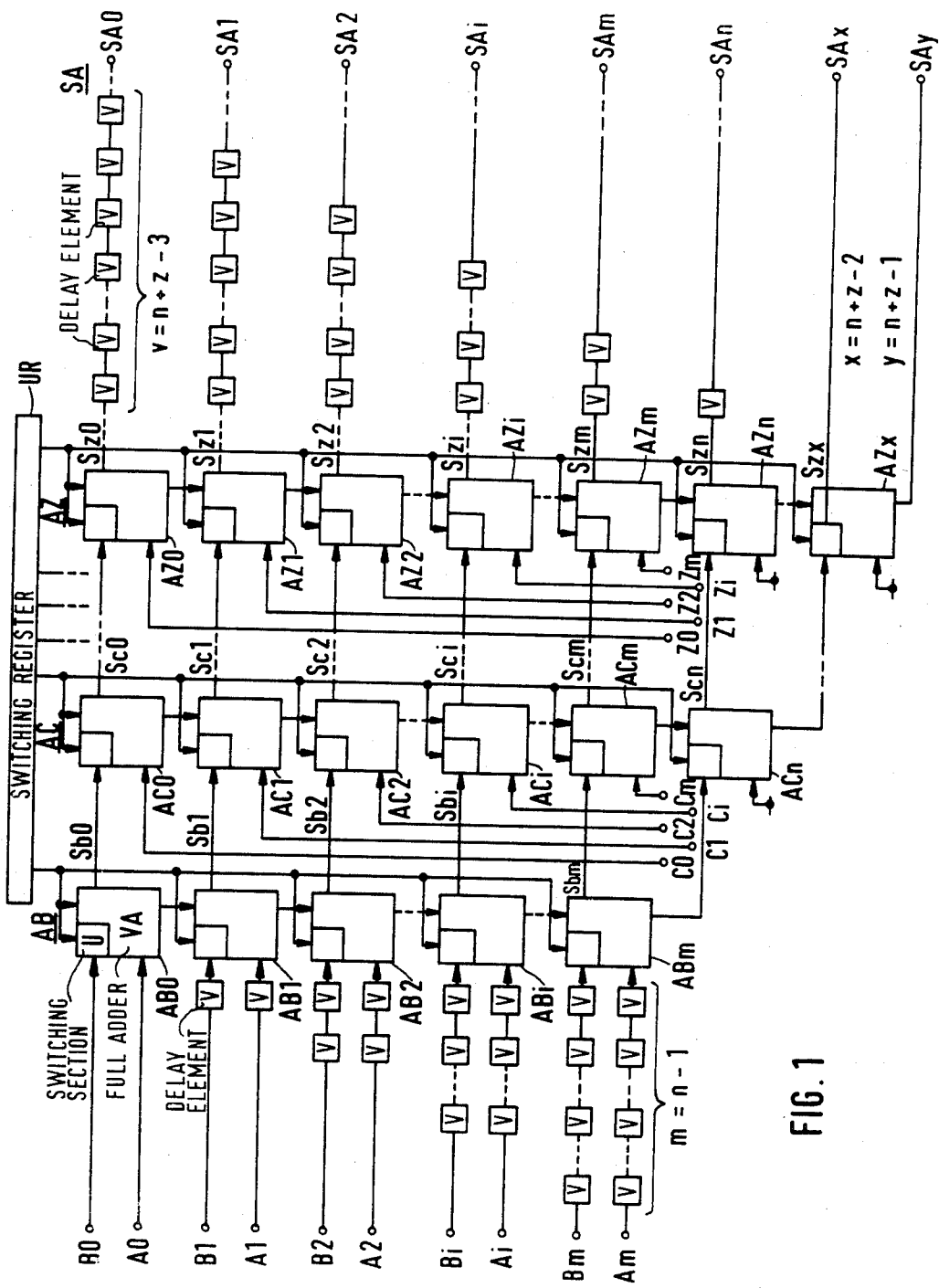
FIG. 1 is a block diagram of a parallel adder/subtracter according to the principles of the present invention.

The embodiment shown in the block diagram of FIG. 1 is designed to successively sum the numbers A, B, C . . . Z, the parallel adders/subtracters AB, AC, AZ necessary for the partial sums $Sb=A+B$, $Sc=Sb+C$, and $Sz=Sc+ \ldots Z$ being shown by solid lines, while the arbitrary number of additional parallel adders/subtracters for the numbers lying between C and Z is indicated by dashed lines. As aleady explained by way of introduction, the parallel adders/subtracters include adder/subtracter stages individually assigned to each bit of the numbers and partial sums and designated AB0, AB1, AB2, ABi, ABm; AC0, AC1, AC2, ACi, ACm, ACn; AZ0, AZ1, AZ2, AZi, AZm, AZn, AZx, where $m=n-1$ and $x=n+z-2$, z being the quantity of the numbers A . . . Z.

Figure 2:
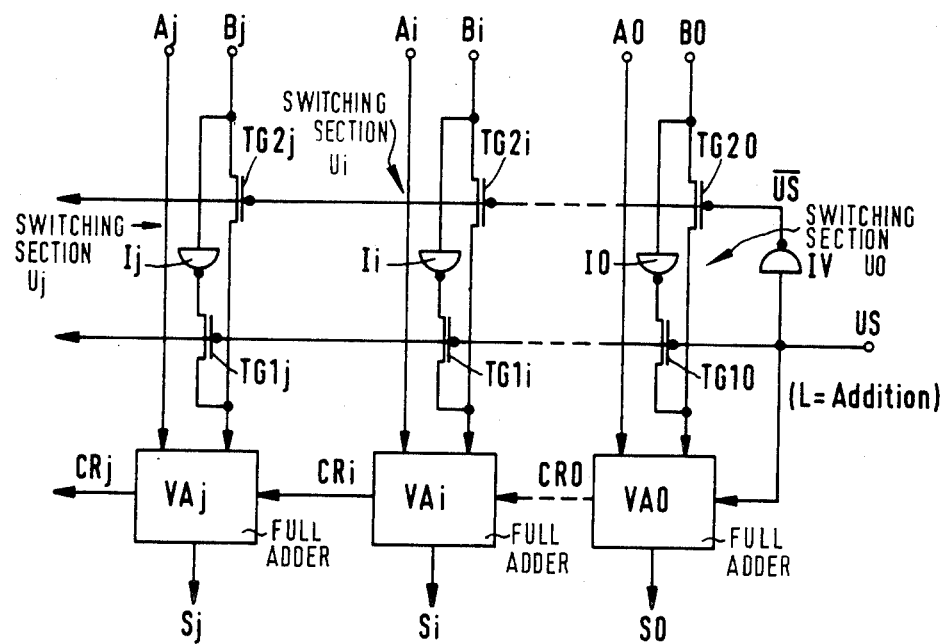
FIG. 2 is a block diagram of the adder/subtracter stage employed in the parallel ader/subtracter of FIG. 1.

Each adder/subtracter stage includes the usual full adder VA and the switching section U, which may be constructed as shown in the circuit of FIG. 2. In FIG. 1 the reference characters VA and U have been entered only in the adder-subtracter stage AB0 for the sake of clarity.

The digit signals A0, B0 of the least significant digits of the two numbers A, B are applied, respectively, to the first input of the full adder VA and to the second input of the switching section U Switching Section U has a input which is fed with the switching signal from the switching register UR. The switching register UR holds digital signals corresponding to the signs of the individual numbers, which signs must be taken into account during summing. In positive logic, which is assumed for the embodiment of FIG. 1, the low binary level, L, is stored for addition, i.e., a plus sign, and the high binary level, H, is stored for subtraction, i.e., a minus sign.

The calculation of the least significant digit signals continues as follows. The sum output of the full adder VA of the adder/subtracter stage AB0 provides the sum signal Sb0, which is applied to the second input of the switching section of the adder/subtracter stage AC0, while the carry output of the full adder VA of the adder/subtracter stage AB0 is connected to the carry input of the full adder of the adder/subtracter stage AB1 associated with the next higher-order digit position.

The first input of the full adder of the adder/subtracter stage AC0 is presented with the digit signal C0 of the number C, while the carry input of the full adder and the first input of the associated switching section are supplied with the appropriate switching signal from register UR. The sum output of the adder/subtracter stage AC0 provides the sum signal Sc0, which, if the corresponding connecting line is imagined as a solid line, is applied to the second input of the switching section of the adder/subtracter stage AZ0.

The first input of the full adder forming part of the adder/subtracter stage AZ0 is fed with the digit signal Z0 of the number Z, while the carry input of this full adder and the first input of the associated switching section are again presented with the appropriate switching signal from register UR. The sum output of this full adder thus provides the sum signal Sz0.

The aforementioned adder/subtracter stages AB1, AB2, ABi, ABm, assigned to the partial sum Sb, are linked with the adder/subtracter stages AC1, AC2, ACi, ACm, AZ1, AZ2, AZi, AZm, which are correspondingly associated with the partial sums Sc and Sz and fed with the digit signals C1, C2, Ci, Cm, Z1, Z2, Zi, Zm and the sum signals Sb1, Sb2, Sbi, Sbm, Sc1, Sc2, Sci, Scm, Sz1, Sz2, Szi, Szm, Szn, Szx, in the manner just described. However, the three adder/subtracter stages ACn, AZn and AZx of FIG. 1 differ from the other stages, which are fed with digit signals of the numbers, in that these three stages only process carry signals. In the case of the adder/subtracter stage Acn, for example, the carry signal from the last adder stage ABm of the parallel adder/subtracter AB, assigned to the partial sum Sb, is applied to the second input of the switching section while the first input of the full adder is grounded, i.e., constantly supplied with the low binary signal level L. The output of this adder/subtracter stage ACn provides the most significant bit of the parallel adder/subtrater AC, i.e., the sum signal Scn, so that the partial sum Sc has one bit more than the partial sum Sb.

Each following parallel adder/subtracter must be supplemented by an additional adder/subtracter stage in the manner described, so that the parallel adder/subtracter AZ has $z-n-2$ additional adder/subtracter stages, of which those designated by the reference characters AZn and AZx are shown in FIG. 1.

This extension beyond the bit number n of the numbers A, B, C . . . Z follows from the mathematical fact that the summing of z n-digit binary numbers gives a sum having $n+z-1$ binary digits. Since the most significant digit of this sum is obtained as a carry during addition, the parallel adder/subtracter of the last partial sum must thus have $n+z-2$ adder/subtracter stages.

While the two digit signals A0, B0 are applied to the lowest-order adder/subtracter stage AB0 of the parallel/adder subtracter AB directly, in accordance with the invention, the next higher-order digit signals are applied to the respective adder/subtracter stages via delay elements V, whose number increases by one from stage to stage. The digit signals A1, B1 are applied to the adder/subtracter stage AB1 via one delay element V each; the digit signals A2, B2 are applied to the adder/subtracter stage AB2 via two series-connected delay elements V each; the digit signals $A_i$, $B_i$ are applied to the adder/subtracter stage $AB_i$ via i series-connected delay elements V each, and the most significant digit signals Am, Bm are applied to the adder/subtracter stage ABm via $m=n-1$ series-connected delay elements V each. By inserting the delay elements, V the digit signals A1, B1, for example, which are to be summed in the adder/subtracter stage AB1, are delayed so that they do not appear at the input until the carry signal from the adder/subtracter stage AB0, which processes the least significant digit signals A0, B0, is available. The most significant digit signals Am, Bm thus are not available at the inputs of the highest-order adder/subtracter stage ABm until the carry signal from the preceding adder/subtracter stage appears at the carry input of the stage ABm. Thus, unlike in the prior art, it is not necessary to provide any special stages for carry save.

While the delay elements V at the input end of the parallel adder/subtracter increase in number by one with increasing weight of the digit signals, according to a further essential feature of the invention, like delay elements V must be provided at the output end whose number decreases by one as the weight of the output digit signals increases. The highest-order adder/subtracter stage AZx of the parallel adder/subtracter AZ, just as the lowest-order adder/subtracter stage AB0 of the parallel adder/subtracter AB, thus has no delay element V, i.e., its output providing the sum signal Szx is connected directly to the termnal SAx of the sum output SA. In the next lower-order adder/subtracter stage, which is not shown in FIG. 1, one delay element V is inserted between the output providing the corresponding sum signal and the associated terminal of the sum output SA. Above the lower-order adder/subtracter stages of the parallel adder/subtracter AZ, the number of delay elements V inserted between the output providing the corresponding sum signal and the associated terminal of the sum output SA increases by one from stage to stage.

In FIG. 1 this regularity can be shown only incompletely because of the representation chosen for the construction described. At any rate, the dashed connecting lines between the individual delay elements V and the associated terminals of the sum output SA indicate that, in accordance with the regularity described, corresponding numbers of additonal delay elements are present. If, on the other hand, the connections for the carry signals, indicated by dashed lines in the parallel adder/subtracter AZ, were replaced by direct connections, the device would be a seven-stage parallel adder/subtracter. Then, as actually shown in FIG. 1, its sixth (Szn), fifth, fourth, third, second, and first adder/subtracter stages would be followed by one, two, three, four, five, and six delay elements V, respectively. The general rule for the maximum number of delay elements V to be assigned to the lowest-order adder/subtracter stage Sz0 is that $v = n + Z - 3$ delay elements are required, where n is the number of digits of the numbers A, B, C, ... Z, and z is the quantity of these numbers. If the connections indicated by dashed lines in FIG. 1 were replaced by direct connections, FIG. 1 would correspond to a parallel adder/subtracter for five-digit numbers, so that $v = 6$, q.e.d.

By the delay elements V inserted in the output circuit in accordance with the invention, the individual digit signals are thus caused to appear at the sum output SA at the same instant, i.e., the binary output word is available in parallel form at the same instant.

FIG. 2 shows some adder/subtracter stages which can be used to advantage in the invention and, hence, in the embodiment of FIG. 1. These are the stages designated by the consecutive numbers 0, i, j, each of which, in turn, includes a full adder VA0, VAi, VAj, and an associated switching section U0, Ui, Uj. The construction of the full adders is not shown in detail in FIG. 2, since it is possible to use conventional full-adder circuits.

The switching sections U0, Ui, Uj are of identical construction and each comprise an inverter I0, Ii, Ij, whose input is connected to the second input of the switching section, i.e., to the input fed with the subtrahend in case of subtraction. In FIG. 2 these second inputs are fed with the digit signals B0, Bi, Bj.

Each switching section U0, Ui, Uj further includes a first transfer element TG10, TG1i, TG1j, which has its signal path connected between the inverter output and the output of the switching section. Finally, each switching section U0, Ui, Uj contains a second transfer element TG20, TG2i, TG2j, which has its signal path connected between the second input and the output of the switching section. In other words: The signal paths of the transfer-element pairs TG10, TG20, TG1i, TG2i, and TG1j, TG2j are interconnected at the output of the switching section and, thus, at the second full-adder input, while the other end of the second transfer element TG20, TG2i, TG2j is presented with the (subtrahend) digit signal B0, Bi, Bj.

The control inputs of the first transfer elements TG10, TG1i, TG1j are connected together and fed with the switching signal US, which, in positive logic as assumed hereinabove, must be in the low state L, in case of addition.

The control inputs of the second transfer elements TG20, TG2i, TG2j are connected together, too, and they are supplied with the switching signal $\overline{US}$ inverted by the common inverter IV.

Thus, in case of addition (US=L, $\overline{US}$=H), the second transfer elements TG20, TG2i, TG2j, are rendered conductive, so that the digit signals B0, Bi, Bj are passed in noninverted form to the full adders VA0, VAi, VAj. In case of subtraction (US=H, $\overline{US}$=L), however, the second transfer elements are nonconducting, while the first transfer elements TG10, TG1i, TG1j are conducting, so that the digit signals B0, Bi, Bj are passed in inverted form to the full adders. Subtraction is thus accomplished in the known manner by complementing.

It should be pointed out that the carry input of the lowest-order full adder VA0 is fed with the switching signal US, i.e., is L in case of addition, but H in case of subtraction, which permits ones complement subtraction. The forwarding of the most significant carry signal to the lowest-order full adder (end-around carry), which is necesary in the prior art arrangement shown in FIG. IX.28 on page 125 of the book referred to above, is thus unnecessary in the arrangement of FIG. 2, which gives a considerable reduction in adding/subtracting time.

The reference characters S0, Si, Sj in FIG. 2 indicate that the sum signals of the respective full adders can be obtained there, and the reference characters CR0, CRi, CRj indicate that the carry signals are passed on there.

Figure 3:
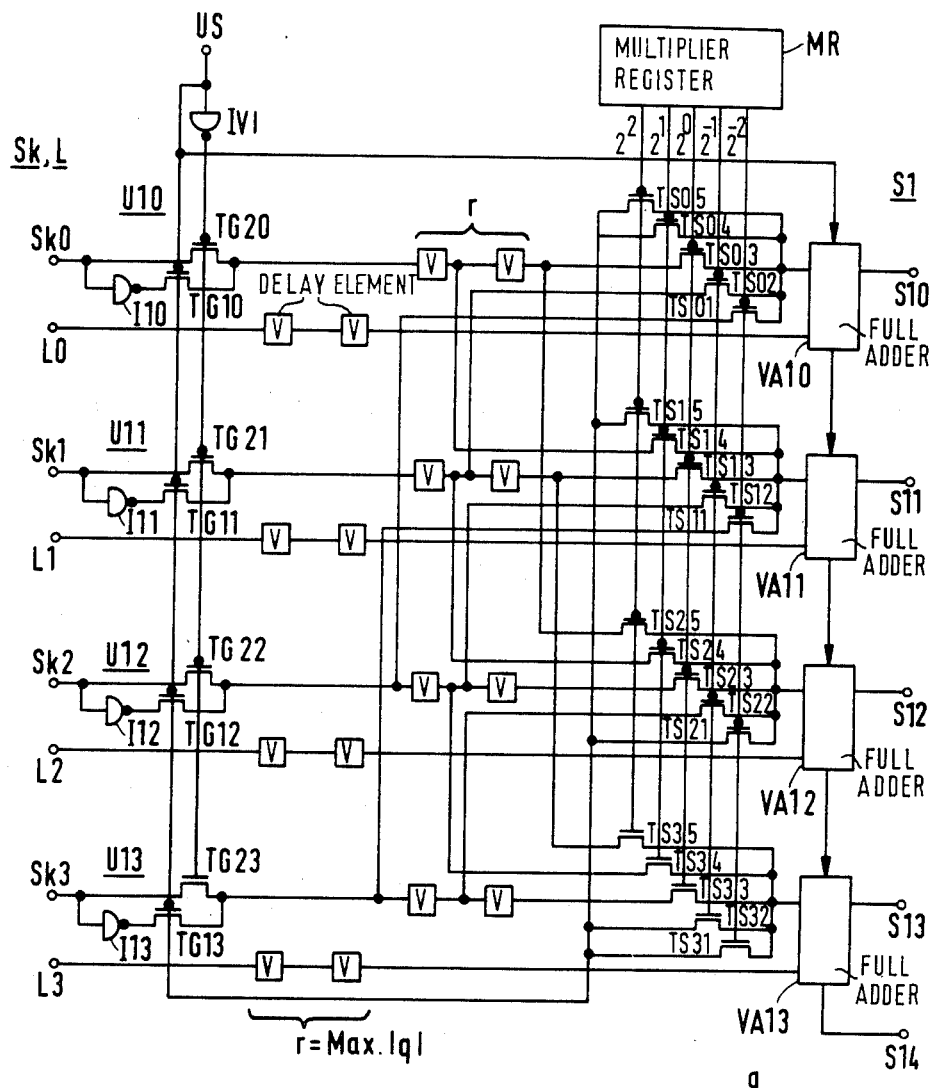
FIG. 3 is a block diagram of an embodiment of a parallel adder/subtracter of the present invention to sum two 4-bit numbers, one of which is to be multiplied by one of the five powers of two $2^2, 2^1, 2^0, 2^{-1}, 2^{-2}$.

FIG. 3 shows an embodiment of the invention illustrated in FIG. 1 which can be used in the parallel adder/subtracter according to the present invention if one of the partial sums or numbers is to be multiplied by a factor which is a power of two with a predetermined exponent q. This may be required in parallel adders/subtracters to be used in digital filters, for example. The additional power-of-two multiplication can be performed particularly advantageously with the help of transfer elements such as are shown for the switching sections of FIG. 2.

FIG. 3 shows how, by means of the adder/subtracter stages VA10, VA11, VA12, VA13, which form the partial sum S1, the number L and the preceding partial sum Sk can be so added that the equation $$Sl = \pm Sk \cdot 2^l + L$$

is satisfied. For the concrete embodiment of FIG. 3 it is thus assumed that the partial sum Sk and the number L are four-digit numbers.

The left part of FIG. 3 shows the switching sections U10, U11, U12, U13, each including inverters I10, I11, I12, I13, first transfer elements TG10, TG11, TG12, TG13, and second transfer elements TG20, TG21, TG22, TG23. In addition, there is a common inverter IV1, which is fed with the switching signal US, which is also applied to the carry input of the lowest-order full adder VA10.

According to an advantageous aspect of the present invention, two additional delay elements V are placed in series between the output of each of the switching sections U10 to U13 and the corresponding full-adder input. On the full-adder side, the signal path of the transfer stage assigned to 2°, TS03, TS13, TS23, TS33, is inserted.

For each positive and negative exponent to base 2 which is different from zero, the respective full-adder input is also preceded by the additional transfer stages TS01, TS02, TS04, TS05; TS11, TS12, TS14, TS15; TS21, TS22, TS24, TS25, and TS31, TS32, TS34, TS35. In the embodiment, these are assigned to the powers of two $2^{-2}$, $2^{-1}$, $2^1$, $2^2$ in such a way that the transfer elements designated by the final reference digits 1, 2, 4, and 5 belong to $2^{-2}$, $2^{-1}$, $2^1$, and $2^2$, respectively. The control inputs of the transfer stages TS . . . are presented with corresponding binary signals which are stored in the multiplier register MR.

The other ends of the signal paths of the transfer stages TS . . . not assigned to $2^0$ are connected to corresponding circuit points in higher-order or lower-order stages. For instance, the transfer stages TS . . . 2, assigned to the first negative exponent $2^{-1}$, have the other ends of their signal paths connected to the node of the next to the last and last delay elements V for the next higher-order digit signals, the direction of count for the additional delay elements V in FIG. 3 being from left to right. The transfer stage TS02 (having the lowest weight 0) is connected to the node of the two delay elements V in the row therebelow, which has the weight 1. In similar fashion, the transfer stage TS12 is connected to the node of the row therebelow and the delay elements assigned to the weight 2. Comparable remarks apply to the transfer stage TS22, while the transfer stage TS32 in the last row, having the weight 3, is connected to the switching signal US.

Transfer stages assigned to the second negative exponent $2^{-2}$, which are designated by the final reference digit 1, are connected to a delay element V in a row processing next higher-order digit signals plus one or, in the absence of this row, must be fed with the switching signal US. For example, the transfer stage TS01 of FIG. 3 is connected to the input of the first delay element V in the next row plus one, which has the weight 2. Similarly, the transfer stage TS11 in the row with the weight 1 is connected to the input of the first delay element V in the row with the weight 3, while the transfer stages TS21, TS31 are connected to the switching signal US.

For the transfer stages assigned to the positive exponents $2^1$, $2^2$, which are designated by the final reference digits 4, 5, analogous remarks apply with the difference that they are connected to delay elements V in lower-order rather than higher-order rows. For example, the transfer stage TS34 is connected to the node of the two delay elements V in the next lower-order row, having the weight 2. Similarly, the transfer stage TS24 of this row is connected to the node of the two delay elements V in the row with the weight 1, and the transfer stage TS14 from this row is connected to the point in the row with the weight 0, while the transfer stage TS04 of this lowest-order row is again connected to the switching signal US.

The transfer stages designated by the final reference digit 5 are connected to the output of the last delay element V in the next lower-order row plus one, cf., for example, the transfer stage TS35 is connected to the row with the weight 1 and the transfer stage TS25 is connected in the row with the lowest weight 0, while the transfer stages TS15, TS05 are connected to the switching signal US.

The number r of additional delay elements to be provided is equal to the maximum of the absolute value of the exponent q to the base 2:

$$r = \text{Max.} |q|.$$

q, on the other hand is the set of integers: $-r, -r+1, \ldots 0, \ldots r-1, r$. Hence, in the embodiment of FIG. 3, $r = 2$.

By means of the transfer stages TS . . . the digit shift within a binary word, which corresponds to a power-of-two multiplication, is realized in the known manner. If such a multiplication is to be performed, the appropriate transfer stages TS . . . are rendered conductive by the H signal that is applied if positive logic is used as assumed hereinabove, so that the digit signals originating from other rows are applied to the corresponding full adder VA1.

If, as mentioned above, the invention is implemented as a two-phase-clocked circuit with respect to the signal flow, its advantages become particularly evident because the above-described function of delivering all digit signals at the output at a given time is readily compatible therewith. "Two-phase-clocked with respect to the signal flow" means here that the MOS circuit can be realized on the principles of static ratio circuit technology but that transfer transistors alternately clocked by the two clock signals are placed ahead of input points and behind output points. In the simplest case, the two clock signals are square-wave voltages with a 1:1 mark/space ratio which are 180° out of phase with respect to each other. The transfer transistors are usually clocked so that, when the transfer transistor assigned to the input of a given stage is being controlled by one of the clock signals, the transfer transistor assigned to the output of this stage is being controlled by the other clock signal.

If, for example, a usual inverter is provided on this principle with an input transfer transistor and an output transfer transistor which are controlled by the two clock signals, the delay between the signal input ahead of the input transfer transistor and the signal output behind the output transfer transistor is exactly one-half clock-signal period.

In conclusion an essential proportioning feature of the delay elements V of FIGS. 1 and 3 should be pointed out. The delay provided by each delay element V is to be equal to the time a full adder VA requires for carry generation. In the simple case, the delay elements can thus be implemented with the just described inverter with preceding and following transfer transistors, so that the delay produced by them is one-half period of the two clock signals.

The parallel adder/subtracter according to the invention can be integrated using MOS transistors of the same conductivity type, i.e., either P-channel or N-channel devices, in which case it may be advantageous to implement and load transistors of inverters and logic gates as depletion-mode transistors.

It is also possible to integrate the parallel adder/subtracter according to the invention using complementary MOS transistors, i.e., CMOS or COSMOS devices. In this case, the transfer elements and stages are CMOS transmission gates.

While I have described above the principles of my invention in connection with specific apparatus it is to be clearly understood that this description is made only by way of example and not as a limitation to the scope of my invention as set forth in the objects thereof and in the accompanying claims.

What is claimed:

1. A parallel adder/subtracter employing enhancement-mode insulated-gate field-effect transistors for combining a plurality of numbers each represented by a plurality of parallel bits, comprising:

a plurality of binary ripple-carry parallel adders/subtracters, each operating on a pair of digital words coupled thereto, each of said adders/subtracters forming partial sum outputs, each of said plurality of adders/subtracters including a plurality of adder/subtracter stages the partial sum outputs from each stage coupled to the succeeding stage, each said stage being responsive to a different bit of an associated one of said pairs of digital words;

each of said stages comprises a full adder, said full adder having a first input receiving a bit of a first one of said pair of digital words and having a second input; and switching section means having a first input receiving a bit of the second one of said pair of digital words and having an output coupled to said full adder second input, said switching section means being selectively operable to invert or not invert said bit of the second one of said pair of digital words in response to switching signals;

an input delay means for coupling said two numbers to said first one of said adder/subtracters such that each bit of a first of said two numbers and each bit of a second of said numbers is delayed by one predetermined time period greater than the preceding lower order bit of said first number and the preceding lower order bit of said second number, respectively;

a plurality of sum output terminals; and an output delay means for coupling the outputs of a last one of said plurality of adder/subtracters to said plurality of sum output terminals such that each output bit of said last adder/subtracter is delayed by one predetermined time period greater than the succeeding higher order output bit.

2. A parallel adder/subtracter in accordance with claim 1, wherein said predetermined time period is the time required for generation of a carry in one of said full adders.

3. A parallel adder/subtracter in accordance with claim 1, wherein each said switching section comprises:

an inverter having an input coupled to said switching section input;

a first transfer element having a signal path connected between the output of said inverter and said switching section means output, and having a first control input;

a second transfer element having a signal path connected between said switching section means input and output, and having a second control input; and wherein each said switching section means is responsive to a first signal at said first control input to couple said inverter output to said switching section means output and responsive to a second signal at said second control input to couple said switching section means input to said switching section means output.

4. A parallel adder/subtracter in accordance with claim 3 wherein each of said plurality of adder/subtracters comprises:

a first terminal connected in common to said first control input of all of said stages, a second terminal connected in common to said second control input of all of said stages, a common inverter having an input coupled to one of said first or second terminals and its output coupled to the other of said first or second terminals, whereby a first control signal level at said one of said first or second terminals enables said first transfer element signal path of all of said stages while disabling sad second transfer element signal path of all of said stages, and a second control signal level at said one of said first or second terminals enables said second transfer element signal path of all of said stages while disabling said first transfer element signal path of all of said stages.

5. A parallel adder/subtracter in accordance with claim 4, wherein each of said plurality of stages is implemented with MOS transistors of complementary conductivity type, and said first and second transfer elements each comprise CMOS transmission gates.

6. A parallel adder/subtracter in accordance with claim 1, wherein each of said plurality of stages comprises circuits of MOS transistors of the same conductivity type.

7. A parallel adder/subtracter in accordance with claim 6, wherein each of said plurality of stages includes load transistors of the depletion mode type.

8. A parallel adder/subtracter in accordance with claim 1, comprising:

means for multiplying one word of said pair of digital words coupled to at least one of said plurality of adder/subtracters by a selected power of two; and each of said stages of said at least one of said plurality of adder/subtracters including a full adder having a first word input and a second word input for receiving respectively a bit of said one word and a bit of the other word associated with that stage;

said multiplying means comprising in each of said stages of said at least one of said plurality of adder/subtracters;

a predetermined number of serially connected additional delay elements for receiving at one end and delaying the bit of said one word associated with that stage, each delay element having a delay equal to said predetermined time period;

a plurality of multiplying transfer elements each having a control input and a signal path, one end of said signal path of all of said multiplying transfer elements being coupled to said second word input;

said other end of each said signal path being coupled to a predetermined one of the other end of said serially connected additional delay elements of the same or other stage, or to a node between adjacent ones of said serially connected additional delay elements of the same or another stage, or to said one end of the same or another stage or to a node at which said switching signals are received in dependence on said selected power of two.

9. A parallel adder/subtracter according to claim 8, further including a plurality of third circuits each including r other additional delay elements each having a delay equal to said predetermined time period and each coupled to said first input of a different one of said full adders.

10. A parallel adder/subtracter according to claim 8, wherein
each of said stages has a control input to receive an appropriate power of two control signal.

11. A parallel adder/subtracter according to claim 8, wherein each of said switching section means includes
an inverter having its input connected to a second input of said switching section means,
a first transfer element having a signal path connected between the output of said inverter and the output of said switching section means connected to said full adder and a control input connected to said first input of said switching section means responsive to said switching signal and
a second transfer element having a signal path connected between said second input and said output of said switching section means and a control input connected to said first input of said switching section means via a common inverter generating an inverse of said switching signal; and said full adder of the least significant digit includes a carry input coupled to said first input of said switching section means to receive said switching signal.

12. A parallel adder/subtracter according to claim 11, wherein
each of said stages are implemented by MOS transistors of the same conductivity type.

13. A parallel adder/subtracter according to claim 12, wherein
each of said stages include load transistors of the depletion mode type.

14. A parallel adder/subtracter according to claim 11, wherein
each of said stages are implemented by MOS transistors of complementary conductivity type and having transfer elements and stages utilizing CMOS transmission gates.

15. A parallel adder/subtracter according to claim 11, wherein
said adders/subtracters operate as a two phase clocked circuit with respect to signal flow.

16. A parallel adder employing enhancement mode insulated-gate field-effect transistors for adding a plurality of numbers, each represented by a plurality of parallel bits;
at least one adder for combining a first number of said plurality of numbers with a second number of said plurality of numbers to provide a sum output, said at least one adder comprising a plurality of stages connected to form a parallel ripple carry adder, each of said stages combining one bit of said first number with one bit of said second number;
an input delay means for coupling said first and second numbers to said at least one adder, said input delay means directly coupling the lowest order bit of said first number and the lowest order bit of said second number to the lowest order one of said stages, said input delay means serving to delay each bit of said first number and each bit of said second number by one delay time more than the preceding lower order bit of said first and second numbers, respectively, whereby each delay time is a predetermined time;
output sum terminals;
an output delay means interposed between said at least one adder and said sum terminals, said output delay means delaying the lowest order bit of said sum output by a first integer multiple of said delay time, and delaying each higher order bit of said sum output by one delay time less than the preceding lower order bit of said sum;
each of said stages comprising a full adder having a first input for receiving said one bit of said first number and having a second input and a switching section means having a first input for receiving said one bit of said second number and an output coupled to said full adder second input, said switching section means being selectively operable to couple said one bit on said second number to said second input in inverted or uninverted form.

17. A parallel adder in accordance with claim 16, wherein each said switching section means comprises:
an inverter having its input connected to said switching section means first input;
a first transfer element having a signal path connected between the output of said inverter and said switching section means output, and having a first control input; and
a second transfer element having a signal path connected between said switching section means first input and said switching section means output and having a second control input, each said switching section means being responsive to a first signal at said first control input to couple the output of said inverter to said switching section means output and responsive to said second signal at said second control input to couple said switching section means first input to said switching section means output.

18. A parallel adder in accordance with claim 17, wherein said at least one adder comprises:
a first terminal connected in common to said first control input of all of said stages of said at least one adder;
a second terminal connected in common to said second control input of all of said stages of said at least one adder;
a common inverter having its input coupled to one of said first or second terminals and its output coupled to the other of said first or second terminals;
whereby a first control signal level at said one of said first or second terminals enables said first transfer element signal path of all of said stages while disabling said second transfer element signal path of all of said stages and a second control signal level at said one of said first or second terminals enables said second transfer element signal path of all of said stages and disables said first signal transfer element signal path of all of said stages.

19. A parallel adder in accordance with claim 18, wherein said full adder of the lowest order stage includes a carry input coupled to said first control input.

* * * * *